(12) United States Patent
Mendenhall et al.

(10) Patent No.: US 12,546,954 B2
(45) Date of Patent: Feb. 10, 2026

(54) FIBER CABLE JACKET RETENTION FEATURES FOR VSFF FIBER-OPTIC CONNECTORS

(71) Applicant: US Conec Ltd., Hickory, NC (US)

(72) Inventors: Scott Mendenhall, Hickory, NC (US); Jason Higley, Hickory, NC (US); Mitchell Cloud, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 257 days.

(21) Appl. No.: 18/325,800

(22) Filed: May 30, 2023

(65) Prior Publication Data

US 2023/0384533 A1 Nov. 30, 2023

Related U.S. Application Data

(60) Provisional application No. 63/443,156, filed on Feb. 3, 2023, provisional application No. 63/347,041, filed on May 31, 2022.

(51) Int. Cl.
*G02B 6/38* (2006.01)

(52) U.S. Cl.
CPC ......... *G02B 6/3857* (2013.01); *G02B 6/3851* (2013.01)

(58) Field of Classification Search
None
See application file for complete search history.

(56) References Cited

U.S. PATENT DOCUMENTS

| 6,738,555 | B1 | 5/2004 | Cooke et al. | |
|---|---|---|---|---|
| 11,914,195 | B2 | 2/2024 | Higley et al. | |
| 2020/0150357 | A1 * | 5/2020 | Higley | G02B 6/3825 |
| 2021/0223481 | A1 * | 7/2021 | Takeuchi | G02B 6/3887 |

FOREIGN PATENT DOCUMENTS

KR               101051120 B1 * 7/2011

\* cited by examiner

*Primary Examiner* — Chad H Smith
(74) *Attorney, Agent, or Firm* — Michael L Leetzow PLLC; Shubhrangshu Sengupta

(57) ABSTRACT

A fiber optic connector has a crimp body that allows for a heat shrink tube to be abutted to the crimp band used with the crimp body or dispose underneath the crimp band to allow for the use with a VSFF fiber-optic connector.

15 Claims, 16 Drawing Sheets

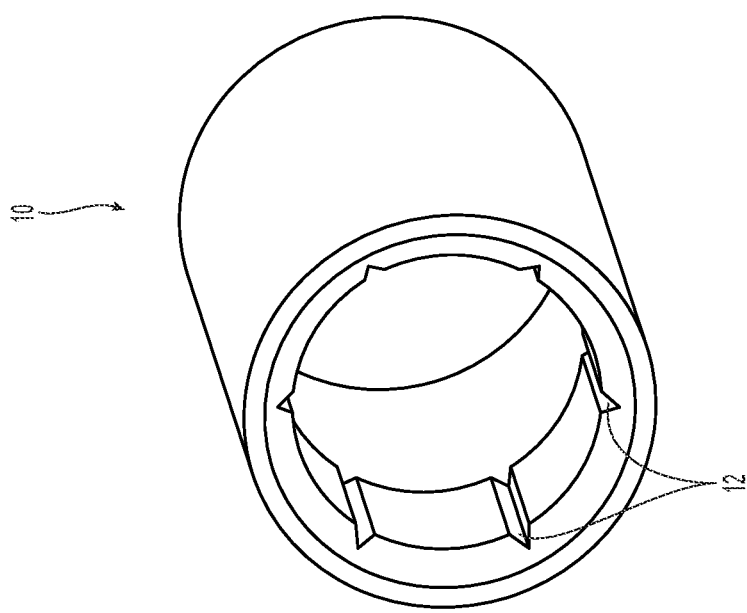

FIBER CABLE JACKET RETENTION FEATURES FOR VSFF FIBER-OPTIC CONNECTORS

REFERENCE TO RELATED CASE

This application claims priority under 35 U.S.C. § 119 (e) to U.S. provisional application Nos. 63/347,041 filed on May 31, 2022 and 63/443,156 filed Feb. 3, 2023, the contents of which are hereby incorporated by reference in their entirety.

BACKGROUND OF THE INVENTION

Very Small Form Factor (VSFF) Fiber-Optic Connectors ("connectors") are now available in the optical communications industry. One such recent "Very Small Form Factor" or "VSFF" fiber optic connector (hereinafter "connector") is the MMC connector described in Applicant's International Patent Application PCT/US2021/028295 (published as WO 2021/217054 A1, hereinafter "the WIPO publication"). The contents of that application are incorporated herein by reference. There is a need for terminating as many optical fibers as possible in such small form factor connectors that may include the MMC connector. Optical fibers are typically contained within a jacket including an aramid yarn (e.g., KEVLAR® brand aramid yarn by DuPont de Nemours, Inc.). The jacket protects the bare optical fibers, and the aramid yarn distributes any axial or tensile load that the jacket may incur away from the bare optical fibers. Typically, the optical fibers within the jacket are stripped and the aramid yarn positioned away from an opening through which the optical fibers enter the connector. Then the optical fibers are cured inside a ferrule held by the connector. The ferrule could be a single fiber ferrule or a multi-fiber ferrule. During the curing process, the fibers piston longitudinally until the epoxy material has finally cured.

Typically, the connectors have a crimp body at a rear end. The crimp body surrounds or forms the opening through which the bare optical fibers go into the connector housing. Again typically, the aramid yarn coexists with the fibers inside the jacket, but is moved away or pulled back so as not to interfere with the positioning of the bare optical fibers as they are inserted into the opening in the housing at the crimp body. The aramid yarn is positioned over the crimp body on an outside surface thereof, while the jacket is stripped and stopped short of the opening at the crimp body as the bare optical fibers are inserted into the connector through the opening. Subsequently, a metallic crimp band is provided over the crimp body and covers the aramid yarn, and in some cases the terminal end of the jacket too. Finally, a heat shrink tube is provided over the rear part of the crimp band and also over the jacket to keep the jacket in place. This metallic crimp band is then crimped using a crimping tool to further secure the aramid yarn and thus the cable to the connector. In traditional termination processes, in the event that there is no heat shrink tube used, the crimp band may have internal broach features to grab onto the jacket (which now partly will go inside the crimp band). This is illustrated in the prior art crimp band shown, for example, in FIG. 1.

However, due to the small space for the opening in which the fibers go, the conventional relative positions of the aramid yarn, the jacket, the crimp band and the heat shrink takes up more space than available, making the termination process challenging and prone to errors when applied to these VSFF connectors.

In the VSFF connectors that have larger fiber optic cable jackets, there is not enough room for a heat shrink to go over the crimp band, mainly due to the close pitch between the connectors, i.e., tight space requirements. If there were more space, a typical crimp solution could be used that includes a heat shrink tube over the end of the crimp band and extending over the cable jacket. Alternatively, even a glue lined heat shrink tube could be a potential solution to couple the fiber cable jacket to the connector/crimp band. However, this solution disrupts the tight space requirements for VSFF connectors.

With this in mind, there are solutions to strain-relieving the cables on these smaller connectors and fiber optic ferrules.

SUMMARY OF THE INVENTION

According to one aspect, the present invention is directed to a very small form factor (VSFF) fiber optic connector that includes a main body having a housing supporting at least one fiber-optic ferrule, the at least one fiber-optic ferrule having at least one optical fiber terminated therein, a crimp body extending rearwardly from the housing and forming an opening to receive the at least one optical fiber, a plurality of securing features distributed circumferentially around a rear portion of the crimp body to engage an aramid yarn of a cable jacket containing the at least one optical fiber, a crimp band disposed over a portion of the crimp body, the crimp band securing the aramid yarn of the cable jacket to the crimp body, and a heat shrink disposed over the securing features and at least a portion of the cable jacket rearward of the opening.

In some embodiments, there may be an annular groove on an outside portion of the crimp body and the heat shrink is disposed over the annular groove to trap the aramid yarn within the annular groove.

In some embodiments, there may be a boot attached to the fiber-optic connector and covering at least a portion of the heat shrink, the crimp band and the cable jacket.

In some embodiments, the heat shrink abuts the crimp band.

In some embodiments, the heat shrink is disposed between the crimp band and the crimp body.

In some embodiments, the securing features include a chamfered surface that circumscribes at least a portion of the circumference of the crimp body.

In some embodiments, each the plurality of securing features is separated from the other by a gap to receive strands of the aramid yarn.

In some embodiments, the securing features have a space between each of the securing features to allow for the aramid yarn to be distributed about the opening.

In some embodiments, there may also be at least two extensions extending from a rearmost portion of the crimp body, the at least two extensions having barbs that extend into the opening from an interior surface of the at least two extensions to engage the cable jacket containing the at least one optical fiber.

In some embodiments, the crimp body is comprised of two separate portions.

In another aspect, the present invention is directed to a process for terminating one or more optical fibers in a fiber-optic connector, the process includes providing a connector housing and a crimp body rearward of the connector housing, providing a cable jacket with aramid yarn and at least one optical fiber therein, placing a boot, a heat shrink and a crimp band over the cable jacket, inserting the at least one optical fiber through an opening formed by the crimp body at a rear end of the crimp body and terminating the optical fiber into a fiber optic ferrule supporting the at least one optical fiber, placing the aramid yarn through one or more gaps between a plurality of securing features on the crimp body, positioning the crimp band over the crimp body upon completion of the curing process with the aramid yarn distributed evenly around the crimp body, covering the aramid yarn exposed rearward of the crimp band with the heat shrink tube, wherein the heat shrink tube is engaged to the plurality of securing features. heating the heat shrink tube over the exposed aramid yarn at a temperature to shrink onto the crimp body without engaging the crimp band, and sliding the boot over the cable jacket, the aramid yarn, the crimp body, the crimp band and the heat shrink tube for engagement with the connector housing.

In some embodiments, the process may also include inserting epoxy for curing the at least one optical fiber through the opening, and curing the epoxy at a curing temperature.

In some embodiments, the crimp band covers a front end of the heat shrink.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 1 is a front perspective view of a prior art crimp band;

DETAILED DESCRIPTION OF THE INVENTION

Figure 2B:
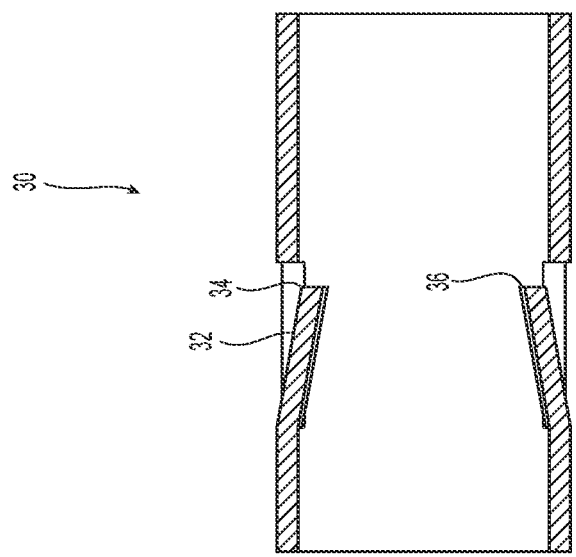
FIG. 2B is a perspective view of an additional crimp band that can be used with the present invention.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 illustrates a prior-art crimp band 10 that is used to strain-relieve fiber optic connectors. The crimp band 10 has features 12 to engage and hold a portion of the jacket of the fiber optic cable when the crimp band 10 is crimped on the rear end of the fiber optic connectors. However, the crimp band 10 is too large to be used with the VSFF connectors.

Figure 2A:
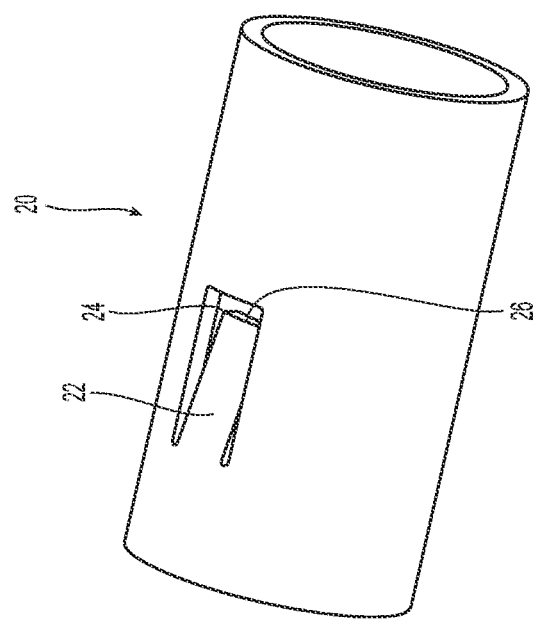
FIG. 2A is a perspective view of one crimp band to be used in the present invention.

FIGS. 2A and 2B illustrate other crimp bands 20 and 30 that use a projection 22, 32 to engage the jacket of the fiber optic cable. The projections 22, 32 are cantilevered portions of the crimp bands and the front ends 24, 34 have an edge 26, 36 that can dig into the jackets when crimped. The crimp band 20 has a circular cross section, while the crimp band 30 has an oval cross section that may be more appropriate for ribbonized optical fibers. This oval configuration allows the heat shrink tube to be omitted from the process.

Figure 3:
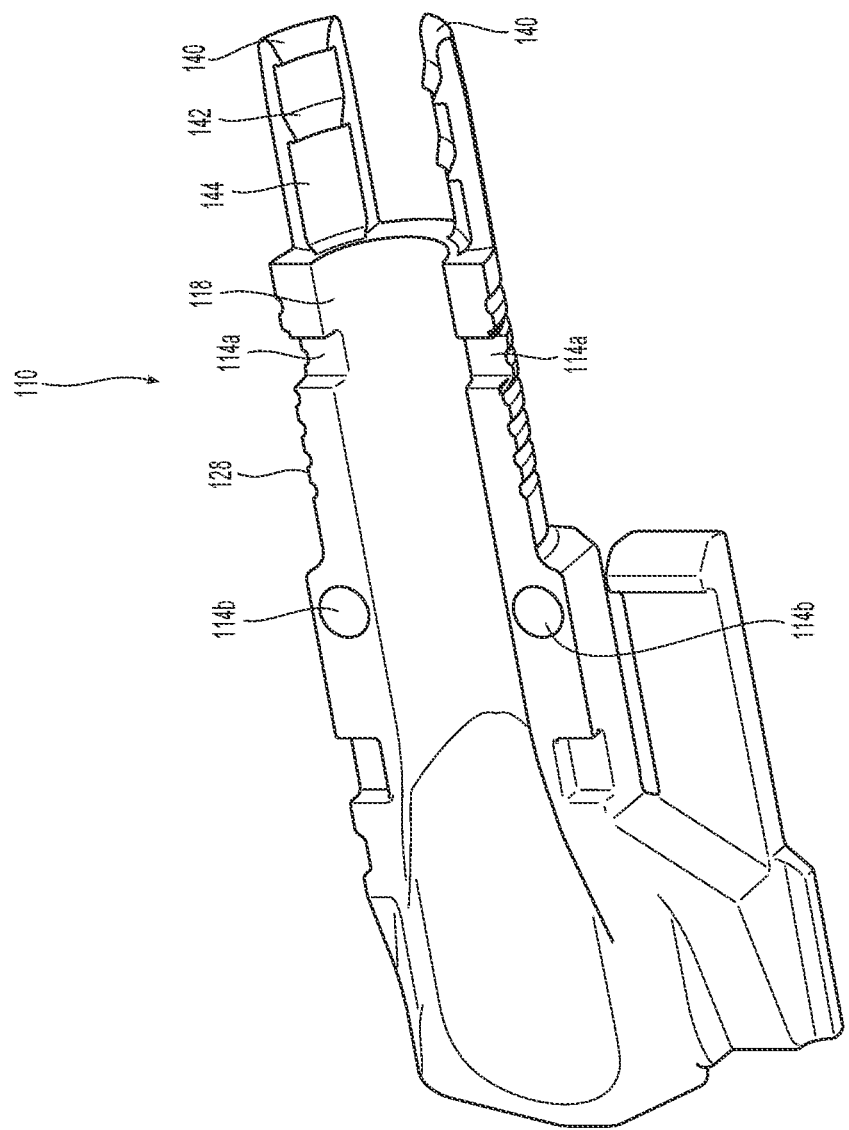
FIG. 3 is a top perspective view of a crimp body portion to match with a housing portion.
Figure 4:
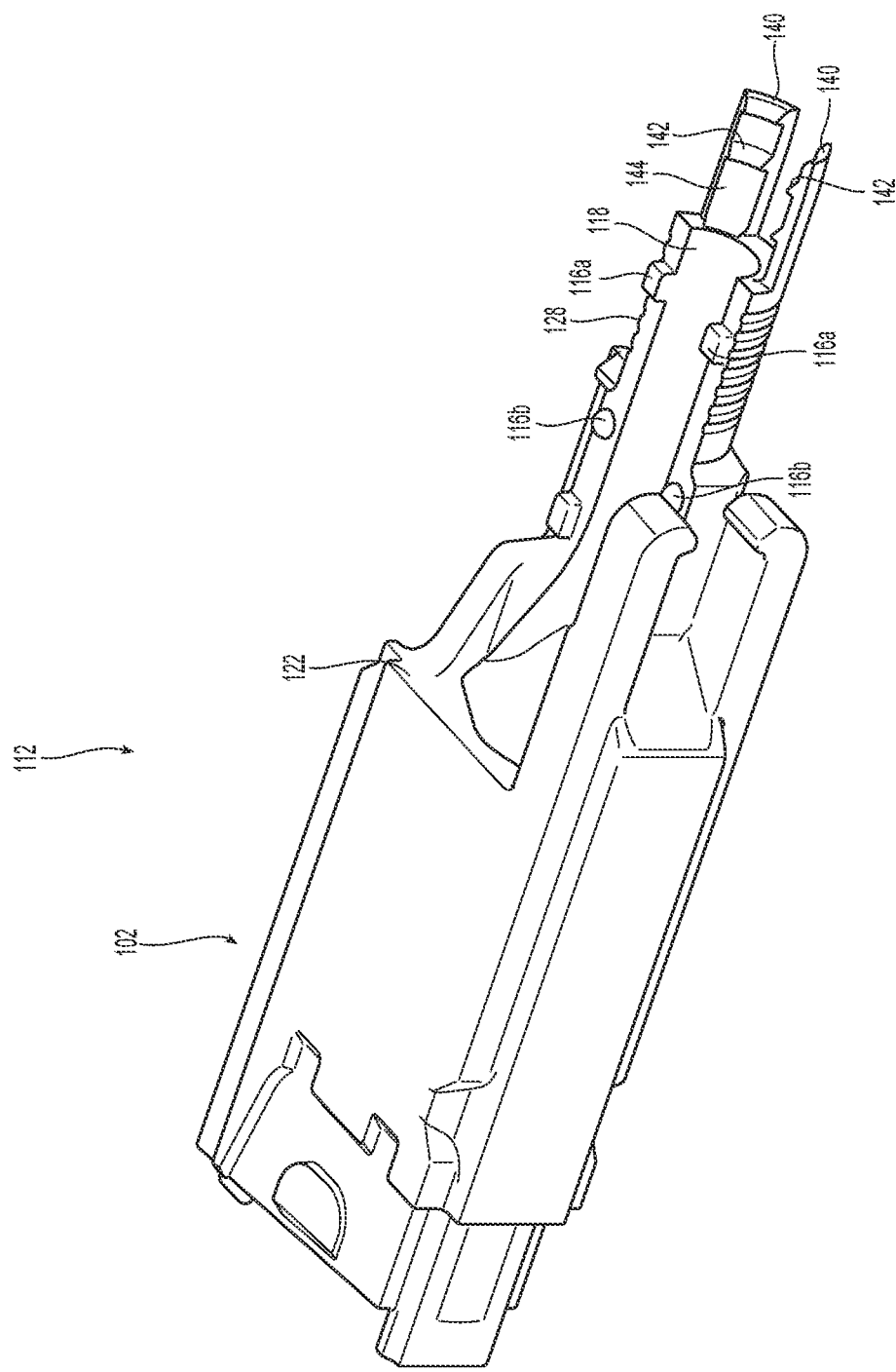
FIG. 4 is top perspective view of a fiber optic connector housing portion with the matching crimp body portion in FIG. 3.
Figure 5:
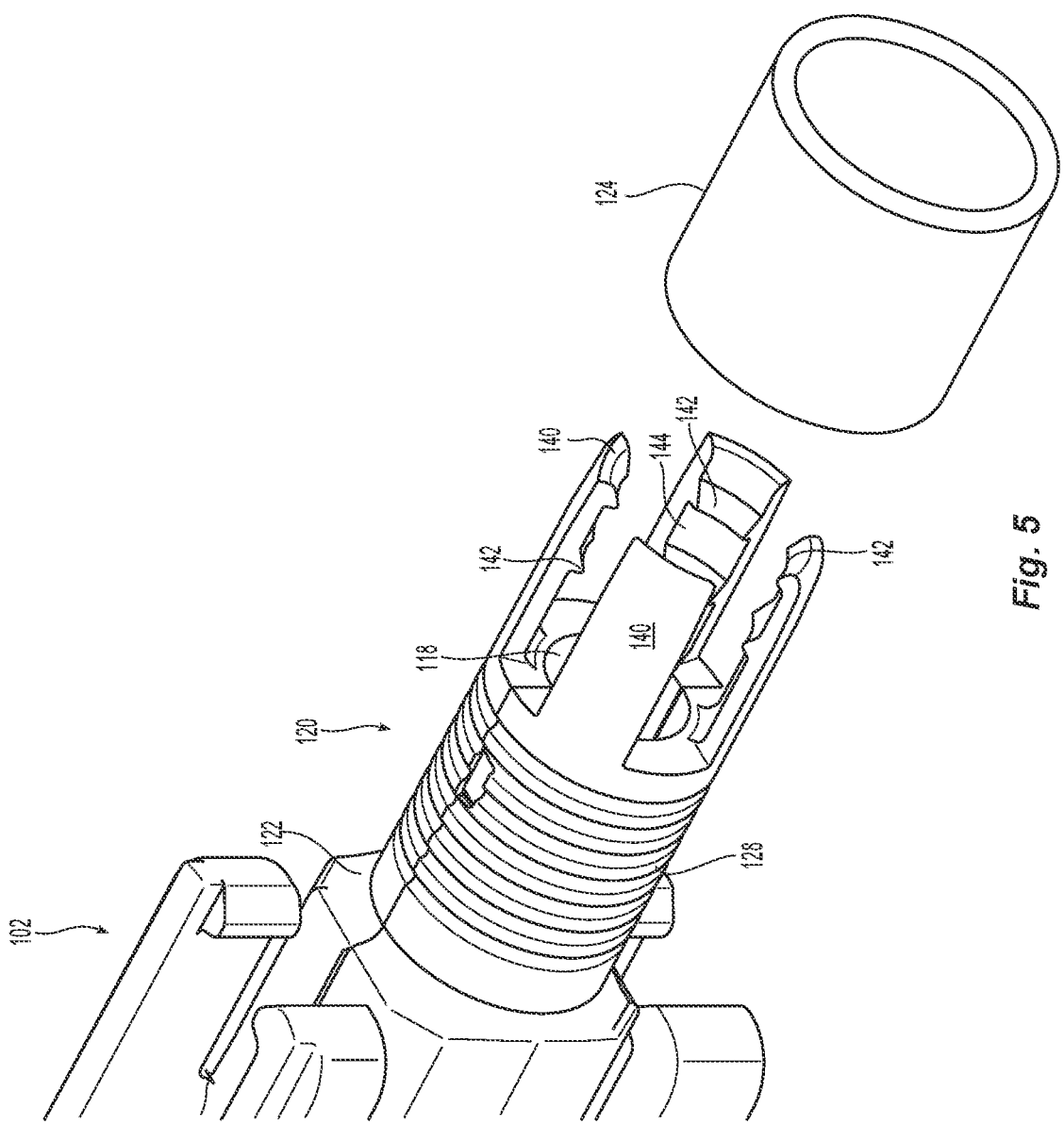
FIG. 5 is a perspective view of the fiber optic connector housing portion of FIG. 4 and crimp body portion of FIG. 3 assembled.

Illustrated in FIGS. 3 and 4 are the components, when joined together form a housing 102 for a connector 100. The connector in this case is described in detail in pending applications (Ser. No. 17/918,058 and Ser. No. 17/918,067, both filed on Oct. 10, 2022), the contents of which are incorporated by reference in their entirety. The housing 102 typically holds a fiber optic ferrule 104 that supports and holds the optical fibers 106. See, e.g., FIG. 12. There may also be a fiber optic ferrule receiver (see, e.g., 508 in FIG. 12) that is attached to the housing 102. The components in FIGS. 3 and 4 include the crimp body portion 110 and the housing portion 112, respectively. The crimp body portion 110 engages and complements the housing portion 112. Further, in this regard, the inside of the crimp body portion 110 is illustrated in FIG. 3. The crimp body portion 110 is flipped over to mate with the housing portion 112 in FIG. 4. Each of the crimp body portion 110 and the housing portion 112 have structures that facilitate the mating of these two portions. The crimp body portion 110 has two different indentations 114a/114b that engage the projections 116a/116b on the housing portion 112. As will be recognized, the indentations 114 could be on the housing portion 112 and the projections 116 could be on the crimp body portion 110. Additionally, while the indentations 114a/114b are square/rectangular and the indentations 116a/116b are semicircular, they could take on other shapes. It is preferable that the indentations 114a/116a have a different configuration or shape from that of indentations 114b/116b, although that need not be mandatory. The mated housing 102 of the crimp body portion 110 and the housing portion 112 is illustrated in FIG. 5.

While the crimp body portion 110 has a part of the housing 102, there is also a portion that comprises half of the crimp body 120. The housing portion 112 has the other half of the crimp body 120. It is possible that one of crimp body portion 110 and the housing portion 112 has more of the crimp body 120 that the other portion. The crimp body 120 extends from the rear 122 of the housing 102 and extends in a rearward direction. The crimp body 120 forms an opening 118 that allows for the optical fibers and the fiber optic cable to be received in the housing 102. Applicant notes that the term "front" or "forward" as used herein means that direction where the fiber optic connectors 100 would meet with another fiber-optic connector or device or mating ferrules, while the term "rear" or "rearward" is used to mean the direction from which the optical fibers enter into the fiber optic connectors 100. Each of the components will therefore have a front and rear, and the two respective fronts or forward portions of opposing ferrules, for example, would engage one another. Thus, for example, in FIG. 4, the "front" of the fiber-optic connectors 100 (and housing 102) is on the left side and "forward" is to the left and into the page. "Rearward" or "rear" is that part of the fiber-optic connectors 100 (and housing 102) that is on the right side of the page and "rearward" and "backward" is toward the right and out of the page.

The crimp band 124 (sometimes called a "crimp ring") surrounds the crimp body 120 and is then crimped onto the crimp body 120 to secure the fiber optic cable 126 securing the aramid yarn 130 therebetween. See FIGS. 10 and 12. There are corrugations 128 that are present on the outside surface of the crimp body 120. The corrugations 128 preferably extend completely around the crimp body 120, but could be partial or randomly spaced on the crimp body 120. The aramid yarn 130 (illustrated in FIG. 12) is preferably spaced around the circumference of the crimp body 120 and pinched between it and the crimp band 124 after the crimp band 124 is crimped to the crimp body 120. The corrugations 128 are able to grab the aramid yarn 130 and retain it more easily than if the crimp body 120 were smooth, which may cause slippage between the aramid yarn and the crimp body. The corrugations 128 could be rounded, pointed, or have any appropriate surface configuration.

Extending rearward of the housing 102 and from the crimp body 120 are four extensions 140. The extensions 140 are positioned to engage the jacket of the fiber optic cable 126 to provide even more strain relief that with just the aramid yarn 130. The extensions 140, with four illustrated in the figures, are positioned radially around the crimp body 120. There may be more or fewer of the extensions 140, and they may be longer or shorter than that illustrated. Preferably, the extensions 140 have barbs 142 on an inside surface 144 of the extensions 140. There are two barbs 142 illustrated on each of the extensions 140, but there may be more or fewer of them and they may be spaced along the inside surface 144 differently than that shown. For example, they may not be aligned with the barbs 142 on the adjacent extensions 140, but rather staggered or randomly placed.

The extensions 140 are illustrated as being straight or linear. However the extensions 140 may be curved so that the extensions 140 are closer to the extensions 140 on the opposite side of the crimp body 120, i.e., they bend inward toward each other.

Figure 6:
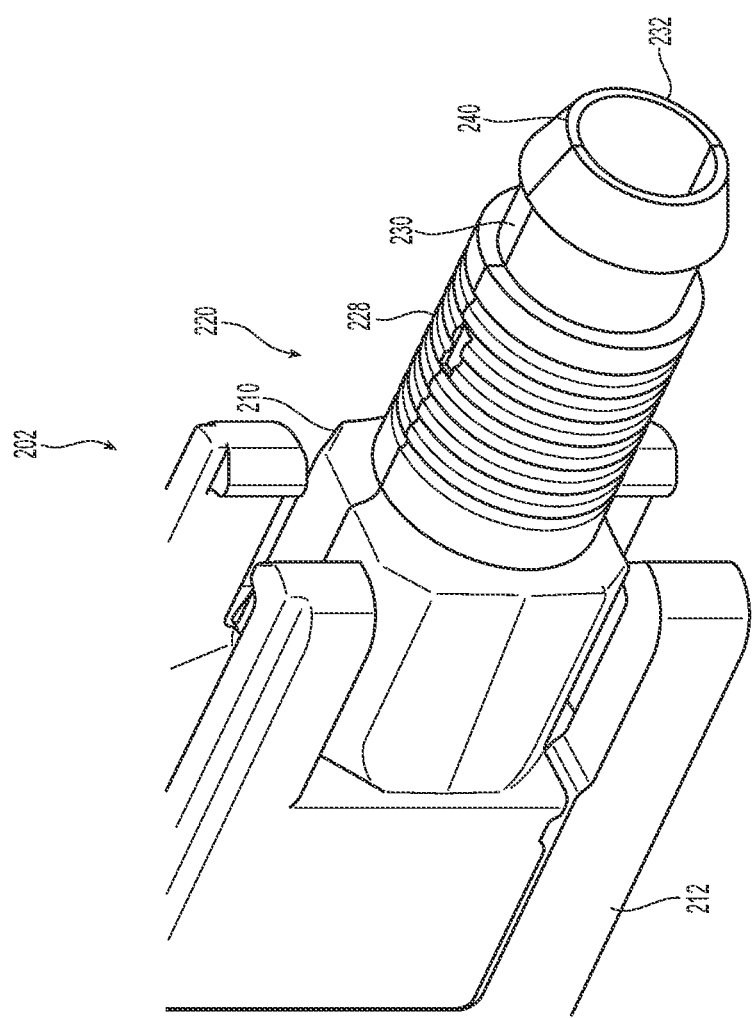
FIG. 6 is a perspective view of another embodiment of a fiber optic connector housing portion and crimp body portion according to the present invention.

A second embodiment of a housing 202 for a connector 100 is illustrated in FIG. 6. The housing 202 may also be comprised of two portions, the crimp body portion 210 and the housing portion 212. The portions 210, 212 also have the same alignment features as in the first embodiment. However, rather than having extensions 140 at the rear end 222, there is a chamfered surface 240 that extends from a rear end 232 of the crimp body back to the housing 202 and creates an annular groove 230 that receives the aramid yarn 130 in the same fashion as the corrugations 128. In this embodiment, the aramid yarn 130 goes over the chamfered surface 240 and through the annular groove 230. There may also be the corrugations 228 to also receive the aramid yarn 130 as well. The annular groove 230 is also where a portion of the heat shrink tube collapses into to better secure the aramid yarn 130 to the crimp body 220. This may happen during curing and also better secures the heath shrink to the housing 202.

Figure 7:
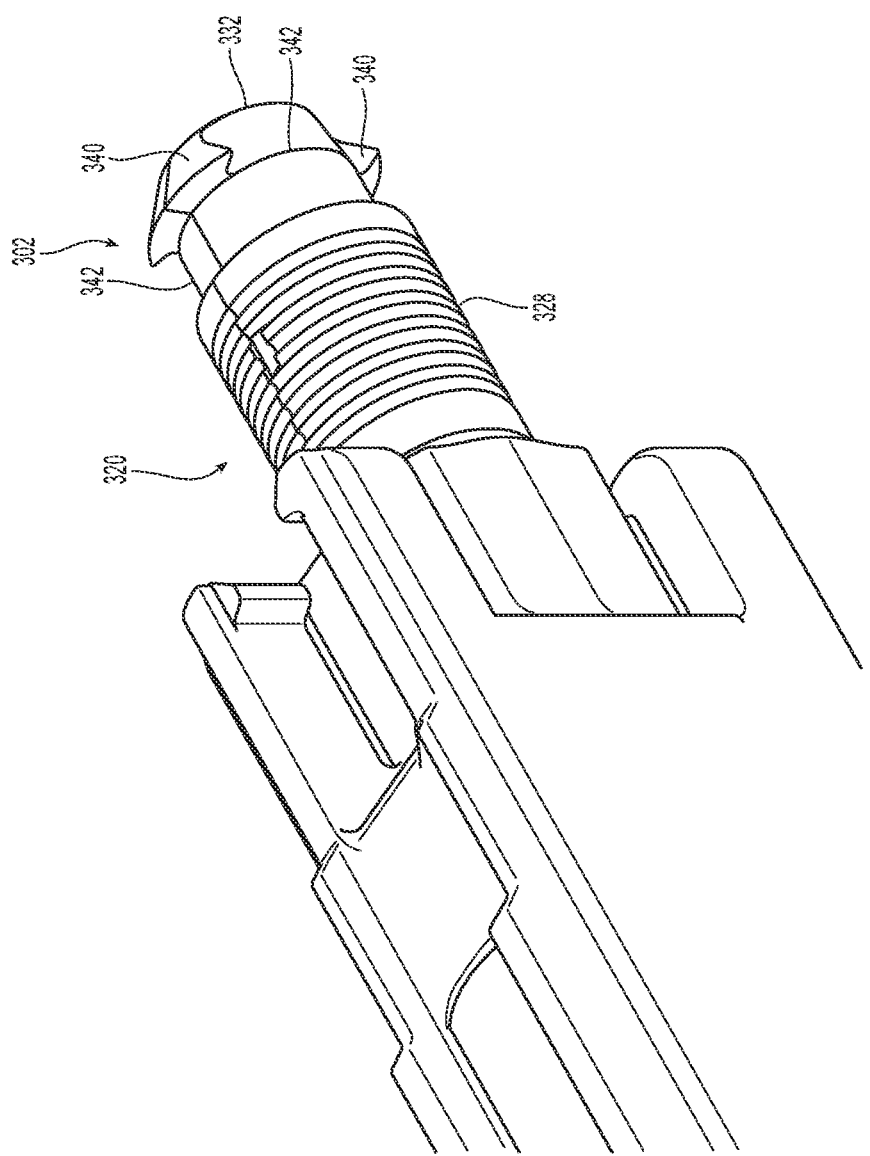
FIG. 7 is a perspective view of another embodiment of a fiber optic connector housing portion and crimp body portion according to the present invention.

A third embodiment of a housing 302 is illustrated in FIG. 7. In this case, the rear end 332 also has a chamfered surface 340 that extends from the rear end 332 of the crimp body back to the housing 302 and creates an annular groove 330 that receives the aramid yarn 130. There may also be corrugations 328 in the portion of the crimp body 320 that is closest to the housing 302. However, the chamfered surface 340 has breaks or openings 342 in it to allow for a more controlled routing of the aramid yarn 130 in the housing 302. While there are two openings 342, there may be fewer or more openings 342, or the openings 342 may be just a reduced height of the chamfered surface 340.

Figure 8:
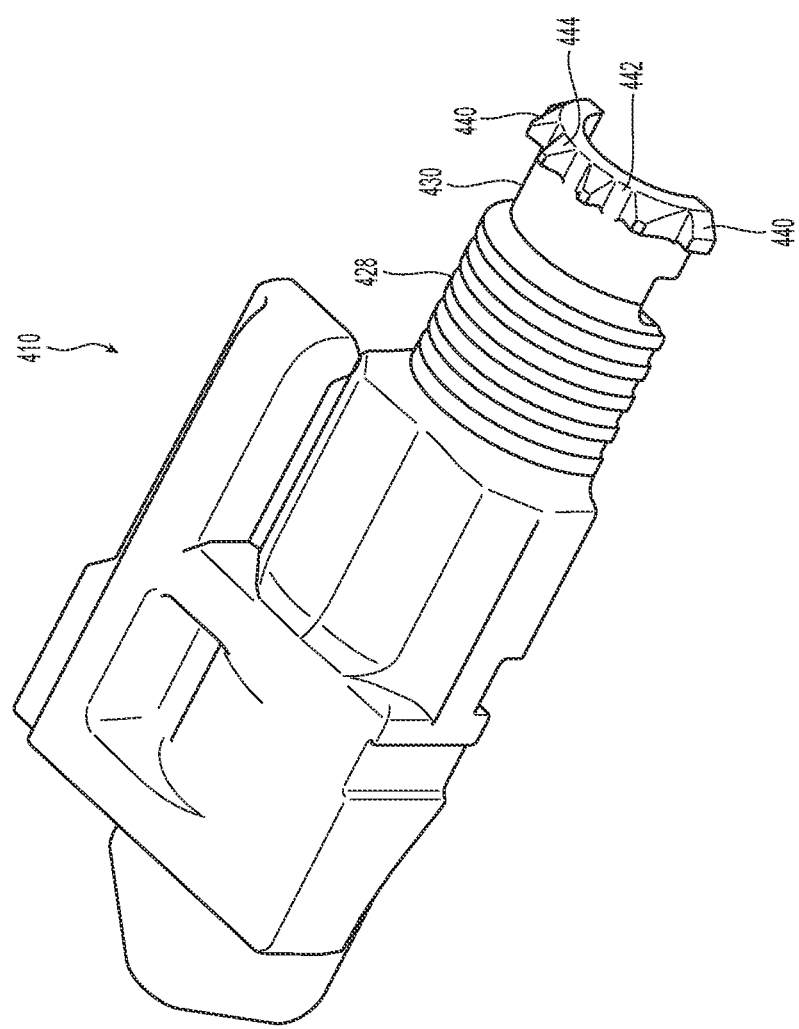
FIG. 8 is a top perspective view of another embodiment of a crimp body portion to match with a housing portion.
Figure 9:
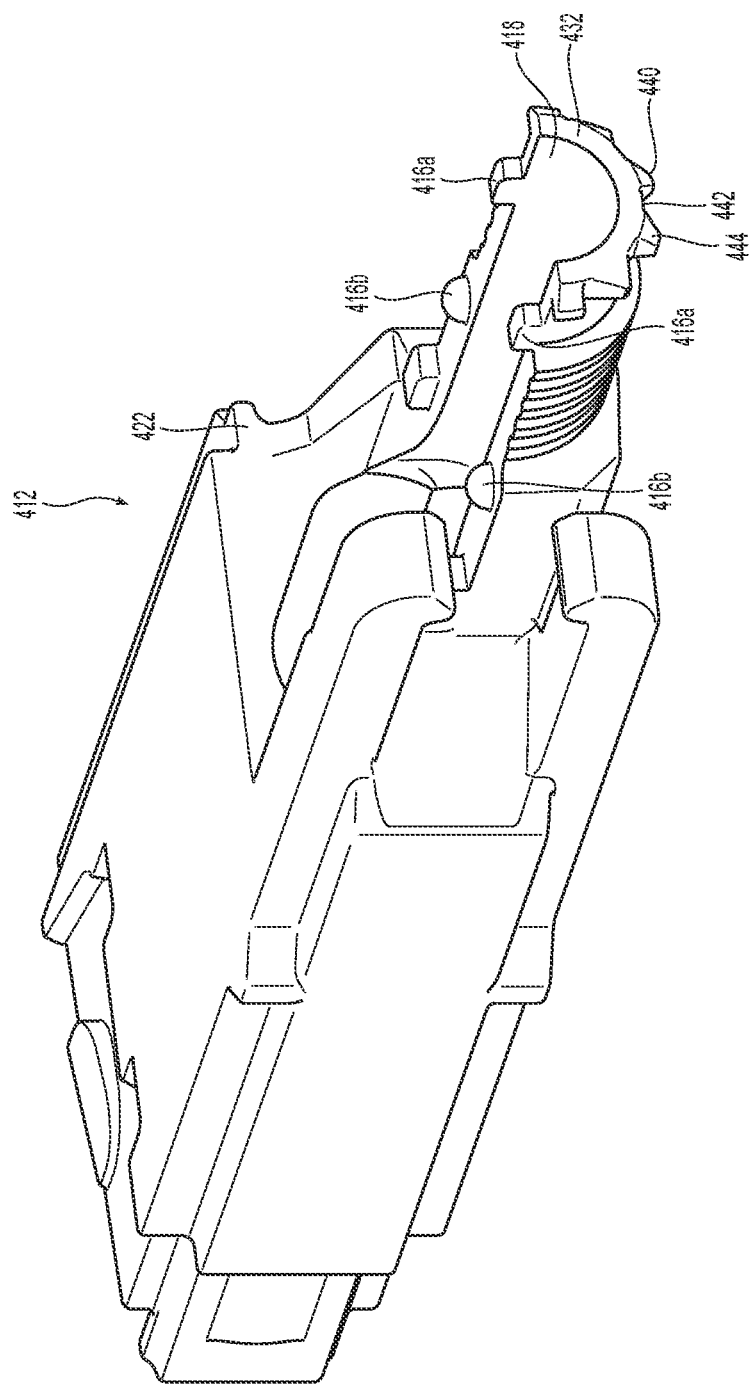
FIG. 9 is a perspective view of a fiber optic connector housing portion to mate with the matching crimp body portion in FIG. 8.
Figure 10:
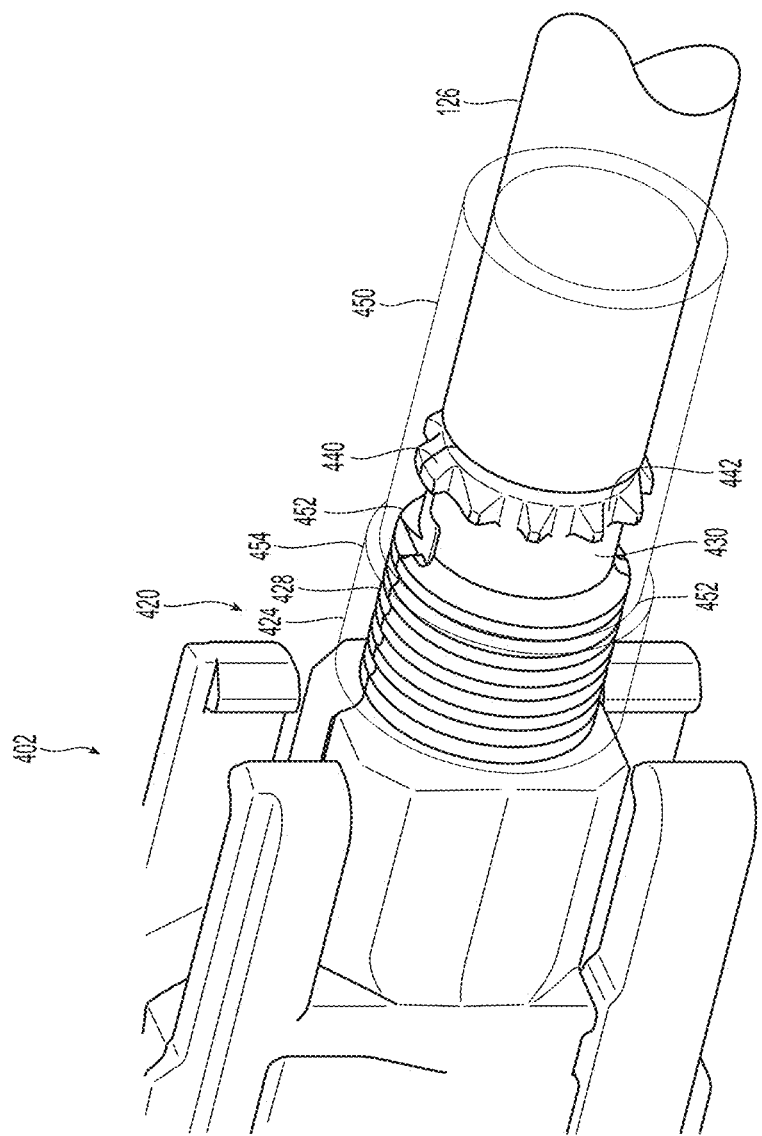
FIG. 10 is a perspective view of the fiber optic connector housing portion in FIG. 9 and crimp body portion in FIG. 8 assembled with the crimp ring and heat shrink shown in phantom.

Another embodiment of a housing 402 is illustrated in FIGS. 8-10. The components in FIGS. 8 and 9 include the crimp body portion 410 and the housing portion 412, respectively. The crimp body portion 410 engages and complements the housing portion 412. Further, in this regard, the outside of the crimp body portion 410 is illustrated in FIG. 8. The crimp body portion 410 is mated with the housing portion 412 in FIG. 10. Each of the crimp body portion 410 and the housing portion 412 have structures that facilitate the mating of these two portions. The housing portion 412 has two different projections 416a/416b that engage corresponding indentations on the crimp body portion 410.

While the crimp body portion 410 has a part of the housing 402, there is also a portion that comprises half of the crimp body 420. The housing portion 412 has the other half of the crimp body 420. It is possible that one of crimp body portion 410 and the housing portion 412 has more of the crimp body 420 that the other portion. The crimp body 420 extends from the rear 422 of the housing 402 and extends in a rearward direction. The crimp body 420 forms an opening 418 that allows for the optical fibers and the fiber optic cable to be received in the housing 402.

There are a plurality of securing features or projections 440 that are disposed around the circumference of the crimp body 420 and the opening 418 at the rear end 432. Between each of these securing features or projections 440 are openings 442 that allow for the aramid yarn 130 to pass between the securing features or projections 440 and into an annular groove 430 for securing the cable to the housing 402. There may also be corrugations 428 in the portion of the crimp body 420 that is closest to the housing 402. The securing features or projections 440 may have a chamfered face 444 that may face rearwardly and away from the housing 402. The openings 442 may also be formed with slanted side walls of the securing features or projections 440.

That is, the openings 442 may have a v-shape or configuration to assist in placing the aramid yarn 130 into the openings 442.

Turning to FIG. 10, there is a crimp band 424 shown in phantom that covers a portion of the crimp body 420. The crimp band 424 covers the corrugations 428 and may also even cover a portion of the annular groove 430. Preferably, the crimp band 424 is disposed against a rear surface 402a of the housing 402 before it is crimped onto the crimp body 420. Directly behind the crimp band 424 is a heat shrink tube 450. The front 452 of the heat shrink tube 450 preferably engages the back end 454 of the crimp band 424. The heat shrink tube 450 is then heated and secures the aramid yarn in the annular groove 430 and the openings 442 of between the securing features or projections 440 of the crimp body 420. The same process happens with the housings 102, 202, and 302. This arrangement of the heat shrink tube 450 being directly behind the crimp band 424 also results in a smaller/shorter crimp band 424 than the conventional crimp band 10, the shorter length being more desirable for VSFF connectors due to their smaller size.

Another embodiment of a connector 500 having a housing 502 is illustrated in FIGS. 11-16. In this embodiment, the heat shrink tube 550 is disposed between the crimp band 524 and the crimp body 520. This embodiment is particularly useful for larger cable diameters (e.g., 2.3 mm fiber optic cables) that have a larger jacket and still allow for the installations in the higher density applications.

Figure 11:
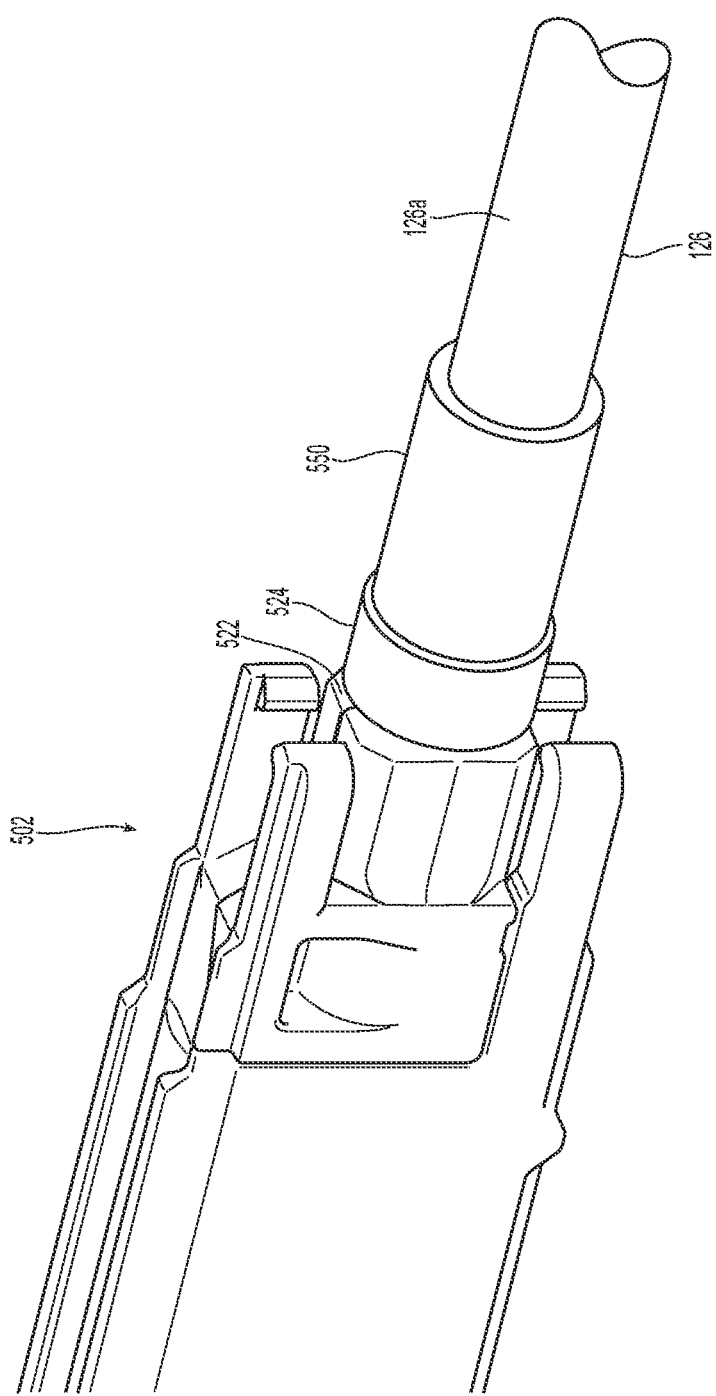
FIG. 11 is a perspective view of the fiber optic connector housing and crimp body portion with a shortened crimp ring and heat shrink abutted to the crimp ring.
Figure 12:
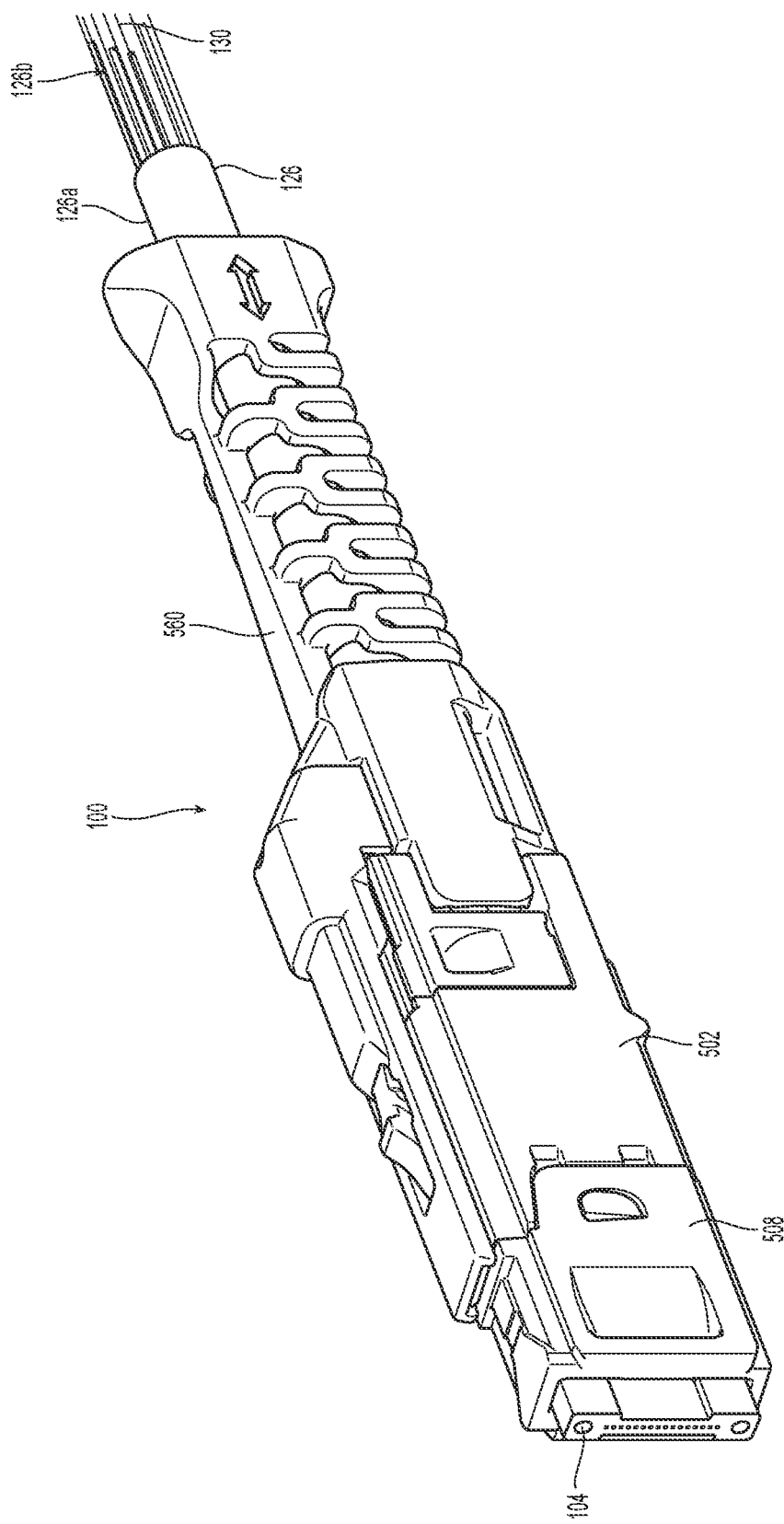
FIG. 12 is perspective of one embodiment of a VSFF connector according to the present invention.

FIG. 11 shows the housing 502 with the crimp band 524 on the heat shrink tube 550 and the fiber optic cable 126 having a jacket 126a. FIG. 12 shows one example of the fiber optic connector 100 that can be used with the housing 502 (or the other housings disclosed herein) and securing of the fiber optic cable 126 and jacket 126a secured thereto. The fiber optic connector 100 has a fiber optic ferrule receiver 508 that attaches to the housing 502 and holds a fiber optic ferrule 104. There is also a push-pull boot 560 that is attached at the rear end of the fiber optic connector 100. The details of the connector are disclosed in the above-referenced applications and will not be repeated here. In this embodiment, the heat shrink tube 550 (a front portion thereof) is positioned underneath the crimp band 524, which is opposite of what is done in conventional fiber-optic connector assembly.

Figure 13:
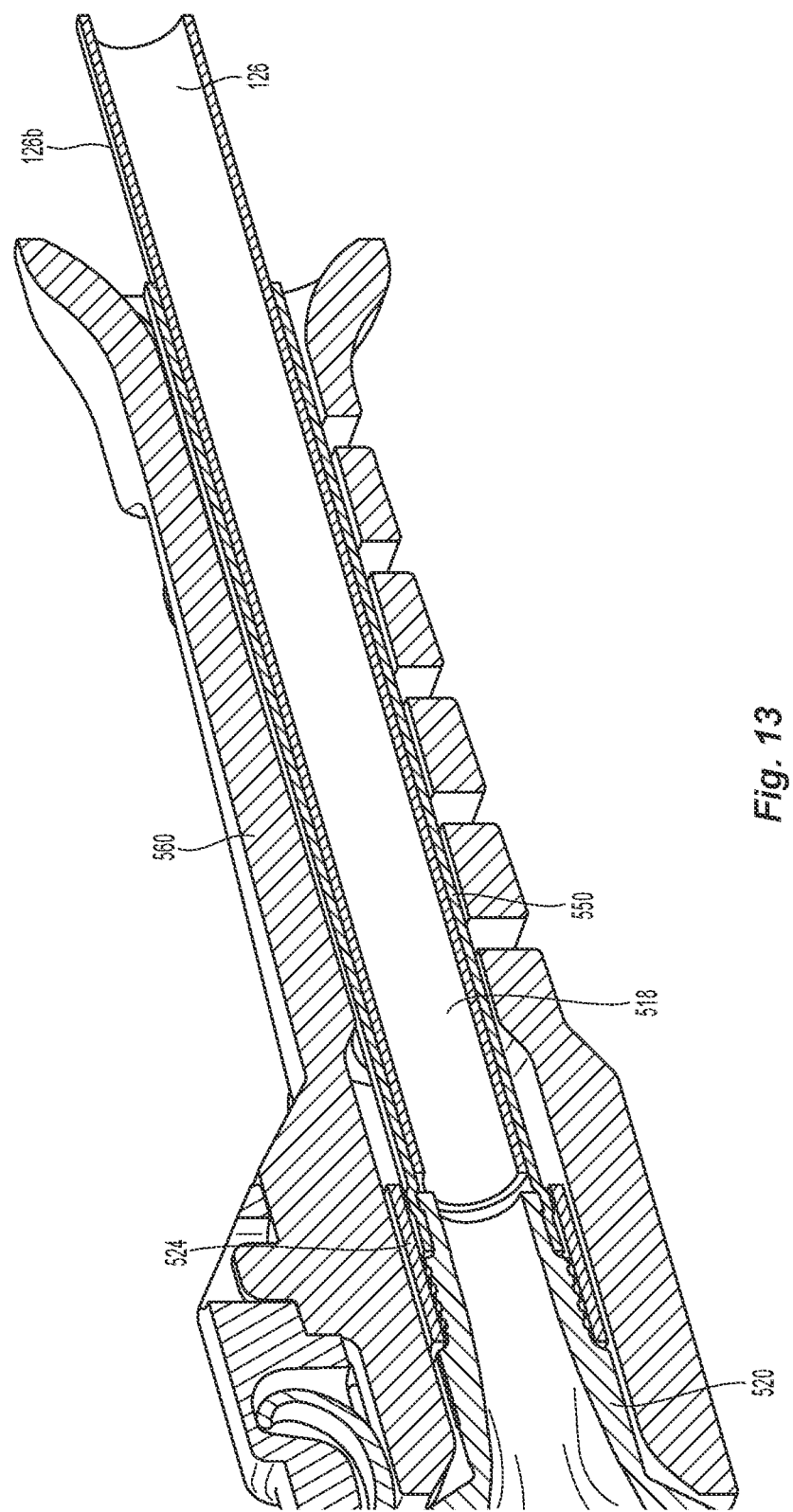
FIG. 13 is a perspective of a partial cross section of the VSFF connector in FIG. 12 illustrating the positions of the cable jacket, the crimp band and crimp body and the heat shrink tube.
Figure 14:
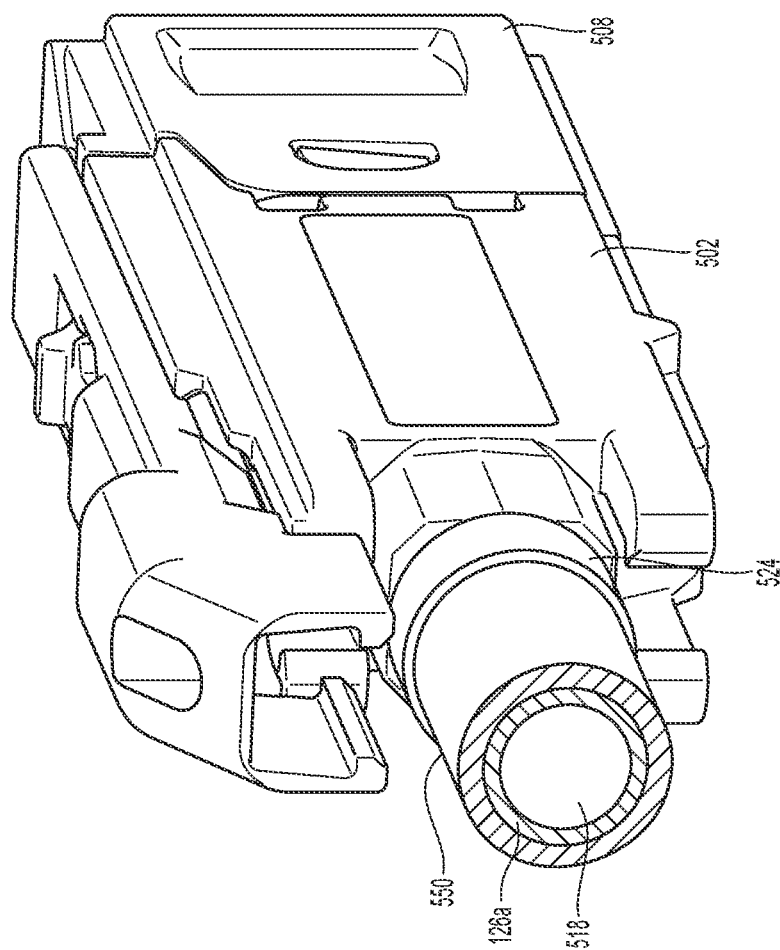
FIG. 14 is view from the rear of a portion of the VSFF connector of FIG. 12 again showing the relationship of the components at the rear of the VSFF connector.
Figure 15:
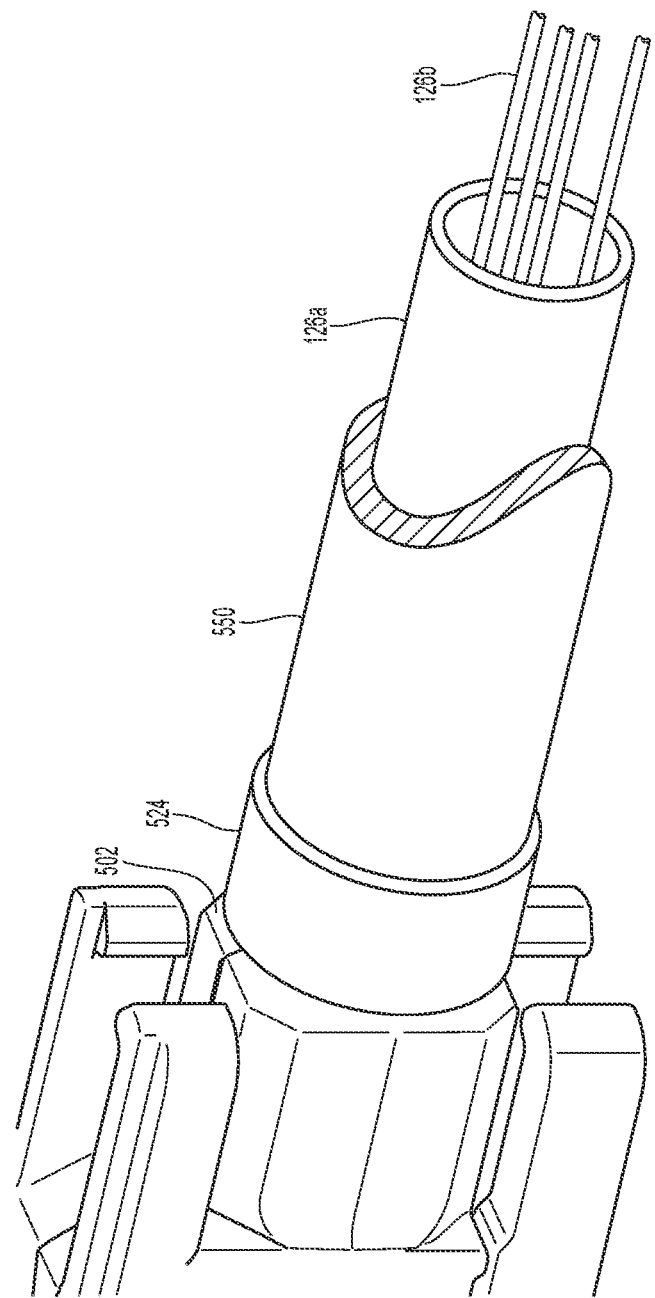
FIG. 15 is perspective view of the VSFF connector fully assembled.

A portion of the fiber optic connector 100 is illustrated in FIGS. 13-15, showing the relationships of the jacket 126a, crimp body 520, crimp band 524 and the heat shrink tube 550. The crimp body 520 can be any of the crimp bodies discussed above, or even be a different crimp body.

Figure 16:
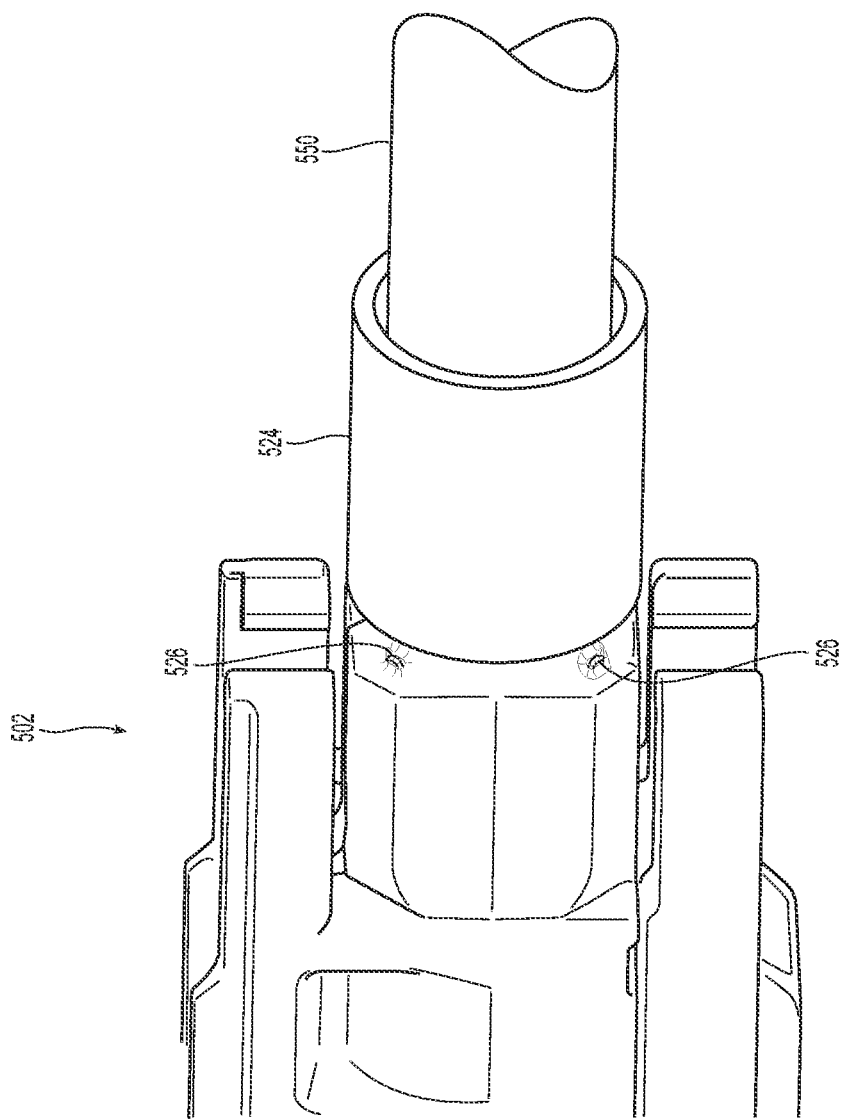
FIG. 16 shows locating projections that assist in positioning the crimp band on the VSFF connector.

As illustrated in FIG. 16, it is preferable that the housing 502 has projections 526 that are disposed on a rear face 522 to assist in positioning the crimp band 524 around the crimp body 520, but to avoid having the crimp band 524 from getting too close to the housing 502. The projections 526 should extend far enough away from the housing 502 and also be of sufficient size that the crimp band 524 engages them and not the housing 502 directly. Thus, the projections 526 should not fall on the outside or the inside of the opening in the crimp band 524.

The process to terminate an optical fiber in the connector 100 is as follows. The connector 100 needs to have a connector housing 502 and a crimp body 520 rearward of the connector housing 502. There also needs to be a cable 126 with a cable jacket 126a with aramid yarn 130 and at least one optical fiber 126b therein. The user then places a boot, such as the push-pull boot 560, a heat shrink tube 560 and a crimp band 524 over the cable jacket 126a. At least one of the optical fibers 126b is placed through an opening 518 formed by the crimp body 520 and terminating the optical fiber 126b into a fiber optic ferrule 104 supporting the at least one optical fiber 126b. The termination includes inserting epoxy and curing the epoxy to secure the at least one optical fiber 126b. The aramid yarn 130 is distributed around the crimp body 520, and preferably through one or more gaps between a plurality of securing features on the crimp body 520 as discussed above. Then the crimp band 524 is placed over the crimp body 520 with the aramid yarn 130 distributed evenly around the crimp body 520. Using the heat shrink tube 550, the aramid yarn 130 exposed rearward of the crimp band 524 is covered. The heat shrink tube 550 is heated over the exposed aramid yarn 130 at a temperature to shrink onto the crimp body 520 without engaging the crimp band 524. Finally, the user slides the boot over the cable jacket 126a, the aramid yarn 130, the crimp body 520, the crimp band 524 and the heat shrink tube 550 for engagement with the connector housing 502.

In one embodiment, the cable jacket 126a may not extend inside the push-pull boot 560. Instead, the cable jacket 126a may stop short of a rear end of the push-pull boot 560 (behind a grasping portion), and the heat shrink tube 550 and the one or more optical fibers may continue inside the push-pull boot 560.

Various aspects of this disclosure can therefore accommodate larger cables (>2.5 mm outer diameter) for VSFF connectors given the smaller dimensions of these connectors. At the same time, this disclosure can also accommodate smaller diameter optical cables and optical fibers too.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A very small form factor (VSFF) fiber optic connector comprising:
   a main body having a housing supporting at least one fiber-optic ferrule, the at least one fiber-optic ferrule having at least one optical fiber terminated therein;
   a crimp body extending rearwardly from the housing and forming an opening to receive the at least one optical fiber;
   a plurality of securing features distributed circumferentially around a rear portion of the crimp body to engage an aramid yarn of a cable jacket containing the at least one optical fiber, the plurality of securing features having openings between at least two of the plurality of securing features, the openings also distributed circumferentially at the rear portion at a same longitudinal location;
   a crimp band disposed over a portion of the crimp body, the crimp band securing the aramid yarn of the cable jacket to the crimp body; and
   a heat shrink disposed over the securing features and at least a portion of the cable jacket rearward of the opening.

2. The VSFF fiber optic connector according to claim 1, further comprising an annular groove on an outside portion of the crimp body and the heat shrink is disposed over the annular groove to trap the aramid yarn within the annular groove.

3. The VSFF fiber optic connector according to claim 1, further comprising a boot attached to the fiber-optic connector and covering at least a portion of the heat shrink, the crimp band and the cable jacket.

4. The VSFF fiber optic connector according to claim 1, wherein the heat shrink abuts the crimp band.

5. The VSFF fiber optic connector according to claim 1, wherein the heat shrink is disposed between the crimp band and the crimp body.

6. The VSFF fiber optic connector according to claim 1, wherein each of the plurality of securing features include a chamfered surface that circumscribes at least a portion of the circumference of the crimp body.

7. The VSFF fiber optic connector according to claim 1, wherein each of the plurality of securing features is separated from the other plurality of securing features by the openings to receive strands of the aramid yarn.

8. The VSFF fiber optic connector according to claim 1, further comprising at least two extensions extending from a rearmost portion of the crimp body, the at least two extensions having barbs that extend into the opening from an interior surface of the at least two extensions to engage the cable jacket containing the at least one optical fiber.

9. The VSFF fiber optic connector according to claim 8, wherein the at least two extensions are biased toward the opening.

10. The VSFF fiber optic connector according to claim 1, wherein the crimp body is comprised of two separate portions.

11. The VSFF fiber optic connector according to claim 1, wherein the crimp body has a plurality of corrugations in an outer surface thereof.

12. A process for terminating one or more optical fibers in a fiber-optic connector, the process comprising:
provinding a connector housing and a crimp body rearward of the connector housing;
providing a cable jacket with aramid yarn and at least one optical fiber therein;
placing a boot, a heat shrink and a crimp band over the cable jacket;
inserting the at least one optical fiber through an opening formed by the crimp body at a rear end of the crimp body and terminating the optical fiber into a fiber optic ferrule supporting the at least one optical fiber;
placing the aramid yarn through one or more openings between a plurality of securing features on the crimp body;
positioning the crimp band over the crimp body upon completion of a curing process with the aramid yarn distributed evenly around the crimp body;
covering the aramid yarn exposed rearward of the crimp band with the heat shrink tube, wherein the heat shrink tube is engaged to the plurality of securing features;
heating the heat shrink tube over the exposed aramid yarn at a temperature to shrink onto the crimp body without engaging the crimp band; and
sliding the boot over the cable jacket, the aramid yarn, the crimp body, the crimp band and the heat shrink tube for engagement with the connector housing.

13. The process according to claim 12, further comprising:
inserting epoxy for curing the at least one optical fiber through the opening; and
curing the epoxy at a curing temperature.

14. The process according to claim 12, wherein the heat shrink does not cover the crimp band.

15. The process according to claim 12, wherein the crimp band covers a front end of the heat shrink.

* * * * *